Nov. 4, 1941.　　　　F. A. ARBOGAST　　　　2,261,867
ARTIFICIAL FISH BAIT
Filed Sept. 24, 1940
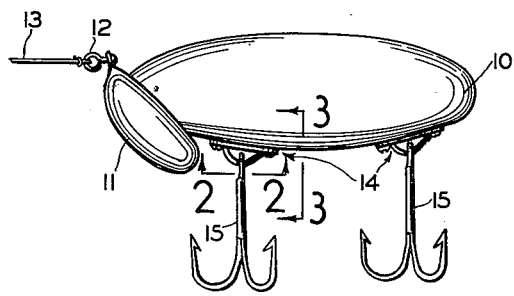
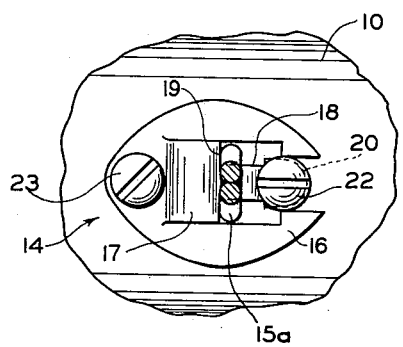
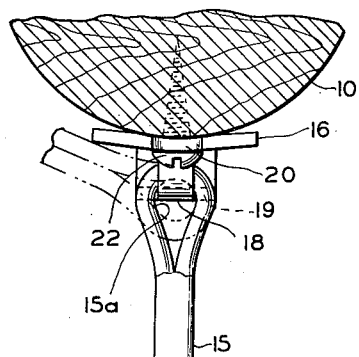
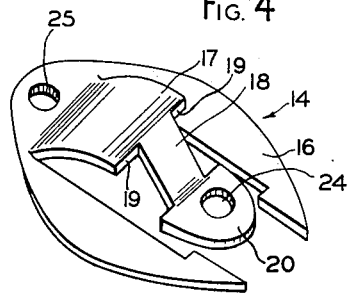
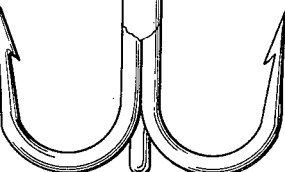
INVENTOR.
FRED A. ARBOGAST Patented Nov. 4, 1941

2,261,867

UNITED STATES PATENT OFFICE 2,261,867

ARTIFICIAL FISH BAIT

Fred A. Arbogast, Akron, Ohio

Application September 24, 1940, Serial No. 358,079

6 Claims. (Cl. 43—28)

This invention relates to artificial fish bait, and in particular relates to hook-attaching devices for fish bait.

An object of this invention is to provide an improved hook-attaching device, for artificial bait bodies, which is simple and inexpensive to manufacture.

Another object of the invention is to provide a hook-attaching device of one-piece construction, having means for limiting swinging movement of the hook in one direction longitudinally of the bait body, to prevent fouling of said hook with another hook or with the fishing line, and means to limit lateral movement of the hook to prevent rubbing off the surface coating of the bait.

Other objects will be manifest from the following brief description and the accompanying drawing.

Of the accompanying drawing:

Figure 1 is a side elevation of an artificial bait body having thereon improved hook-attaching means embodying the invention.

Figure 2 is an enlarged fragmentary cross-section, taken substantially on line 2—2 of Figure 1.

Figure 3 is an enlarged fragmentary cross-section, taken substantially on line 3—3 of Figure 1.

Figure 4 is an enlarged perspective view of the hook-attaching device embodying the invention.

Referring to the drawing, the numeral 10 designates an artificial bait body of generally ovate shape, the front end thereof being provided with a concavo-convex plate 11 for giving a certain type of bait action in the water. An eyelet 12 is swively connected to the plate 11 for attaching the usual fishing line 13. Secured to the under side of the bait body 10 may be one or more attachments 14, 14 for pivotally mounting multiple fish hooks 15, 15. The attachments 14 embodying the present invention may, of course, be used for attaching hooks on other types of bait bodies than that shown herein.

As illustrated in Figure 4, the attachments 14 may be formed from a single blank of sheet metal or the like, as by stamping or like methods, to provide a base plate 16 having a longitudinally extending tongue 17 arched outwardly of the plate. Tongue 17 may have a reduced portion or shank 18 bent or curved inwardly toward plate 16 to provide laterally extending shoulders 19, 19 at the outermost portion of the tongue, the portion 18 terminating in a lug 20, substantially in parallelism with base plate 16. Lug 20 may be spaced normally slightly outwardly of the plane of base plate 16 to permit free passage of the lug through the eyelet 15ª of the fish hook 15, whereby the shank 18 may be received through said eyelet.

After the hook 15 has been mounted on an attachment 14, the latter may be secured to the bait body by means of screws 22, 23, received through apertures 24 and 25 in lug 19 and plate 16 at the end thereof remote from said lug, respectively, lug 19 being yieldingly urged against the surface of body 10, against the inherent resiliency of the tongue 17, by the pressure of screw 22. The attachment 14 is secured on the body 10 with the lug 24 extending rearwardly of the bait. Shoulders 19 will then limit forward swinging movement of the hooks, to prevent the forward hook from becoming entangled in the fish line, or the rear hook from entangling with the forward hook. As shown in chain-dotted lines in Figure 3, lateral swinging movement of the hooks is limited by the shanks thereof engaging the lateral edge portions of plate 16, which extend laterally outwardly as far as desired for this purpose, whereby the hooks or the shanks thereof are prevented from rubbing against the bait body to remove portions of the usual decorative surface coatings thereon.

The present invention provides a simple, inexpensive one-piece attachment for pivotally connecting the usual fish hooks onto bait bodies of various types. Modifications of the invention may be resorted to without departing from the spirit thereof or the scope of the appended claims.

What is claimed is:

1. An attachment for connecting a fish hook to an artificial bait body, comprising a base, an outwardly arched tongue portion extending longitudinally of said base and integral therewith, said tongue having a reduced portion adapted to be received through the eyelet of the usual fish hook, said reduced portion providing shoulders for limiting swinging movement of said hook in one direction longitudinally of said base, said base having laterally extending portions for limiting lateral swinging movement of said hook, and means for securing said attachment to a bait body.

2. An attachment for connecting a fish hook to an artificial bait, comprising a body, an outwardly arched portion extending longitudinally of said body and adapted to be received through the usual eyelet of a fish hook pivotally to mount the hook, means on said body for limiting swinging movement of said hook on its pivot in one direction longitudinally of the body, means on said body for limiting swinging movement of said hook on its pivot laterally of the body, and means for securing said body on a fish bait.

3. An attachment for connecting a fish hook to an artificial bait, comprising a body, an outwardly arched portion extending longitudinally of said body and adapted to be received through the usual eyelet of a fish hook pivotally to mount the hook, means on said body for limiting swinging movement of said hook on its pivot laterally of the body, and means for securing said body on a fish bait.

4. An attachment for connecting a fish hook to an artificial bait body, comprising a base, an outwardly arched tongue connected to said base and adapted to be received through the usual eyelet of a fish hook pivotally to mount said hook, said tongue having shoulder portions thereon for limiting the swing of said hook in one direction longitudinally of said base, said base having laterally extending portions engageable by said hooks to limit lateral swing thereof, and means for securing said attachment to a bait body.

5. An attachment for connecting a fish hook to an artificial bait body, comprising a base, an outwardly arched tongue connected to said base and adapted to be received through the usual eyelet of a fish hook pivotally to mount said hook, said base having laterally extending portions engageable by said hooks to limit lateral swing thereof, and means for securing said attachment to a bait body.

6. An attachment for connecting a fish hook to an artificial bait body, comprising a base, an outwardly arched tongue integral with said base and adapted to be received through the usual eyelet of a fish hook pivotally to mount said hook, shoulder portions on said tongue for limiting the swing of said hook in one direction longitudinally of said base, said base having laterally extending portions engageable by said hook to limit lateral swing thereof, means for securing said base to a bait body, and means for securing the free end of said tongue to said bait body.

FRED A. ARBOGAST.